United States Patent [19]

Gall

[11] 4,357,042
[45] Nov. 2, 1982

[54] BAIL

[75] Inventor: John C. Gall, Chicago, Ill.

[73] Assignee: Sears, Roebuck and Co., Chicago, Ill.

[21] Appl. No.: 188,648

[22] Filed: Sep. 19, 1980

[51] Int. Cl.³ .................... A47J 45/07; B65D 25/28
[52] U.S. Cl. ........................... 294/31.2; 16/114 R;
215/100 A; 220/94 R; 294/149
[58] Field of Search ................. 220/91, 94 R, 306;
294/149, 151, 156, 157, 31.2; 206/151, 150, 431;
215/100 A; 16/114 R; 24/256; 248/318, 359

[56] References Cited

U.S. PATENT DOCUMENTS

| 3,000,527 | 9/1961 | Jennings et al. ............... 215/100 A |
| 3,015,412 | 1/1962 | Klages . |
| 3,120,974 | 2/1964 | Matson . |
| 3,128,903 | 4/1964 | Crisci ................................. 220/306 |
| 3,220,591 | 11/1965 | Hidding ........................ 220/94 R X |
| 3,275,366 | 9/1966 | Hidding ................................ 220/91 |
| 3,285,454 | 11/1966 | Bailey . |
| 3,310,088 | 3/1967 | Hildebrandt . |
| 3,311,252 | 3/1967 | Swartwood et al. ........... 294/31.2 X |
| 3,343,711 | 9/1967 | Godshalk . |
| 3,353,706 | 11/1967 | Godshalk . |
| 3,373,896 | 3/1968 | Davis ................................. 220/306 |
| 3,441,172 | 4/1969 | Dike . |
| 3,463,536 | 8/1969 | Updegraff et al. .............. 215/100 A |
| 3,481,501 | 12/1969 | Anderson . |
| 3,516,571 | 6/1970 | Roper et al. . |
| 3,519,163 | 7/1970 | Bardell ................................ 220/306 |
| 3,587,846 | 6/1971 | Heier .................................. 206/151 |
| 3,612,595 | 10/1971 | Updegraff .................. 215/100 A X |
| 3,730,382 | 5/1973 | Heisler . |
| 3,737,069 | 6/1973 | Owen . |
| 3,804,289 | 4/1974 | Churan . |
| 3,811,597 | 5/1974 | Frankenberg et al. . |
| 3,815,777 | 6/1974 | Churan . |
| 3,868,041 | 2/1975 | Knize . |
| 3,902,630 | 9/1975 | Knize . |
| 3,977,563 | 8/1976 | Holt . |
| 3,999,677 | 12/1976 | Oberkircher . |
| 4,004,710 | 1/1977 | Crisci . |
| 4,045,070 | 8/1977 | Geisinger ................... 215/100 A X |
| 4,090,636 | 5/1978 | Norton . |

FOREIGN PATENT DOCUMENTS 950296 2/1964 United Kingdom .

OTHER PUBLICATIONS

Brochure by Lippy Can Co., Ltd., "The Knize Out-Side Rim Can".
Brochure by Caristrap Corp., "Cariband-A Great Idea for . . . Cans".

Primary Examiner—Allan N. Shoap
Attorney, Agent, or Firm—Arnstein, Gluck & Lehr

[57] ABSTRACT

A one-piece bail for a container having an annular shoulder has a sleeve adapted to be placed about the container and abut the shoulder, first reinforcing means integral with the sleeve for reinforcing the sleeve, second reinforcing means for retaining the disposition between the sleeve and the first reinforcing means, tab means extending from approximately diametrically opposed portions of the first reinforcing means for providing areas of attachment, and a bail portion integral and pivotable with respect to the tab means normally disposed substantially concentrically with the first reinforcing means. The bail is independent of the manufacture of the container and is further independent of any interlocking action of the rim and closure of the container.

12 Claims, 4 Drawing Figures

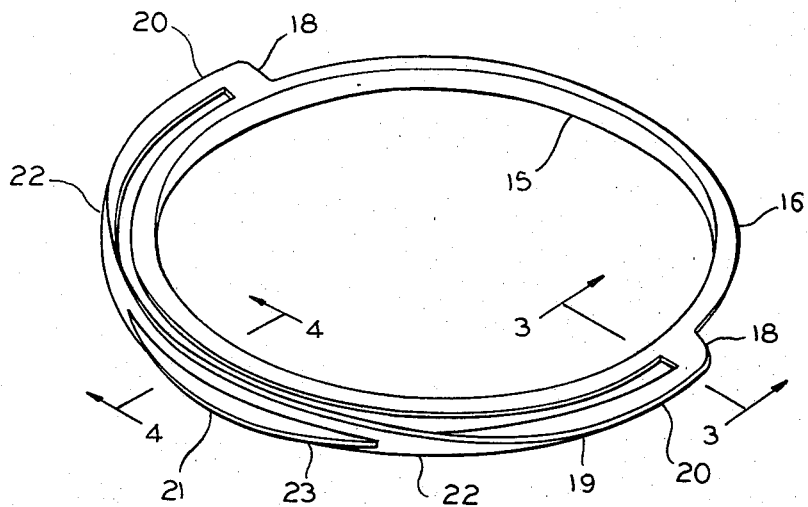
FIG.2
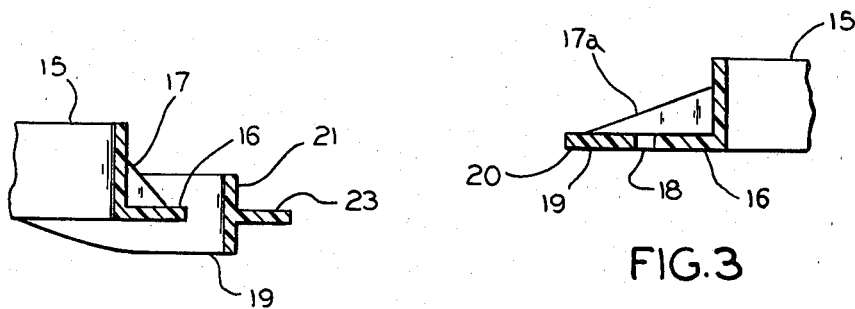
FIG.4
FIG.3

BAIL

FIELD OF THE INVENTION

This invention relates to a bail for a container, and more particularly, to a one-piece bail which is independent of the manufacture of the container.

BACKGROUND OF THE INVENTION

In the manufacture of metal containers, for example paint cans, it has generally been the practice to attach bosses to the sides of the container as attachment points for formed wire bails. Following the introduction of plastic containers, the same concept was applied, except that the bosses were molded as an integral part of the container. Additionally, plastic bails were utilized with plastic containers in a manner similar to that used for the wire bails. The requirement of bosses on the sides of the container to support the bail is objectionable as the bosses complicate the container manufacturing operation, particularly the molding of plastic containers, and provide an obstruction, often requiring a particular orientation, during subsequent filling, sealing, nesting and similar operations.

In the last decade, it has been proposed to provide the bail as an integral part of the container body. For example, U.S. Pat. No. 3,730,382, issued to Raymond A. Heisler on May 1, 1973, discloses a plastic pail having a handle molded integrally with the top rim of the pail. The application of the disclosed integral handle is limited in that the pail and handle must be injection molded and the handle must be mounted near the upper edge at a flange or similar widened structure.

The necessity of molding the handle integrally with the container was eliminated in the disclosure in U.S. Pat. No. 3,737,069 issued to Ronald C. Owen on June 5, 1973. However, in order to provide the carrying ability and stability to the carrier sleeve, the patent provides for the interlocking of the sleeve with the container end and closure assembly. The requirement of the interlocking of the sleeve with the container end severely limits the usefulness of the carrier and complicates the container manufacture or assembly.

Therefore, one object of the present invention is to provide a one-piece bail which can be manufactured independently of the container.

Another object of the invention is to provide a one-piece bail which can be manufactured by injection molding which is adapted to be utilized with containers manufactured of various materials and design.

Still another object of the present invention is to provide a one-piece bail which does not require a particular circumferential orientation and is independent of the design of the upper edge area and closure of the container.

A further object of the invention is to provide a one-piece bail which can be assembled to a container after the latter has been filled and sealed to eliminate problems of obstructions and bail-related orientation during the manufacture, filling and sealing operations.

These and other objects and advantages of the present invention will be readily apparent to those skilled in the art from the following description.

SUMMARY OF THE INVENTION

In general, the objects and purposes of the invention are met by providing a one-piece bail for a container having an annular shoulder in which the bail has a sleeve adapted to be placed about the container and abut its shoulder, first reinforcing means integral with the sleeve for diametrically reinforcing the sleeve, second reinforcing means operable with the sleeve and first reinforcing means for retaining the disposition therebetween, tab means integral with and extending from approximately diametrically opposed portions of the first reinforcing means for providing areas of attachment spaced from the first reinforcing means at approximately diametrically opposed portions, and a bail portion integral with and pivotable with respect to the tab means and the first reinforcing means normally disposed concentrically with respect to the first reinforcing means. In one embodiment the first reinforcing means is an annular flange which extends outwardly from the sleeve, preferably substantially at a right angle therefrom. In the embodiment, the flange may extend substantially from an edge of the sleeve, preferably substantially from the lower edge of the sleeve. The second reinforcing means, in the embodiment can comprise web means extending between the sleeve and the flange for retaining the disposition therebetween. Further in this embodiment, the tab means can comprise a pair of tabs integral with the annular flange and extending from the edge and disposed in the same plane as the flange. The bail portion can include a portion of greater flexibility adjacent the tab means than the flexibility of the remainder of the bail portion, and preferably includes a portion of greater resistance to flexing than the portion of greater flexibility, the portion of greater resistance to flexing being disposed away from the tab means approximately in the center of the bail portion and extending along the bail portion for a substantial distance in each direction from its center.

The bail of the present invention can be utilized with containers manufactured of various materials and construction, for example metal cans, plastic containers, and the like. The reference to "plastic" is understood to refer to polymeric material, and "plastic containers" to containers manufactured of polymeric material, for example, by molding such as by blow molding or injection molding. The container must have an annular shoulder against which the sleeve of the bail is adapted to abut, but otherwise the shape and construction of the container is not of concern to the present invention. The "sides" of container may be straight, e.g. cylindrical or can be tapered. If cylindrical, it is preferred to utilize an elastic sleeve, and if tapered a rigid sleeve may be employed. The annular shoulder of the container can be a portion of the container wall or can be an annular bead or widened portion affixed to or integral with the container wall. The shoulder can be located wherever desired along the height dimension of the container wall, however, it is preferable to locate the shoulder near the upper end of the container for the sake of stability or balance during use of the bail, and to facilitate the stacking or nesting of containers either with or without the bail being present. The upper rim or lip of a container can be used as the shoulder, although it is preferred not to use the upper edge or lip as the shoulder if the presence of the bail of the present invention would interfere with the use of the rim or lip in sealing, stacking or other operation or utilization of the container.

The bail of the present invention is preferably manufactured of plastic material to form a structure having at least portions, such as the sleeve and end areas of the bail portion, which are flexible or pliable. More preferably, the bail is prepared by injection molding of a pliable plastic material, such as polypropylene or polyethylene or similar plastic materials and mixtures of such materials. Injection molding facilitates the provision of structural diametral reinforcement both of the bail structure and of the container wall which will be adjacent the bail structure without undue complication of the manufacture and molding dyes. The reinforcing means preferably comprise flanges and webs as particularly described in the detailed description. These means are conveniently made integral with the bail elements in the injection molding operation.

The bail of the present invention is applied to a container by placing the sleeve of the bail about the side of the container, preferably from the bottom of the container, until the sleeve abuts the shoulder of the container. Plastic containers of the pail type frequently have a taper from the bottom to the top which will facilitate placing of the sleeve about the container and into abutment with the shoulder. In this position, the bail is frictionally retained in abutting relationship with the shoulder, the retention optionally being assisted by an initial upward pull as the bail reaches the shoulder. When use of the bail is desired, the bail portion is simply grasped and pulled upwardly, which will cause the bail portion to pivot with respect to the tab and first reinforcing means to permit the container to be carried or moved as desired. Upon release of the bail portion, the bail portion will return to its original, substantially concentric position due to the resiliency of the plastic material of which the bail, and particularly the bail portion, has been manufactured. The operation and construction of the bail of the present invention will be further understood from the following description of the drawings and preferred embodiment.

BRIEF DESCRIPTION OF THE DRAWINGS

In the drawings:

FIG. 2 is a perspective view of the bail removed from the container and inverted.

FIG. 3 is a sectional view taken along line 3—3 of FIG. 2 and inverted.

FIG. 4 is a sectional view taken along line 4—4 of FIG. 2 and inverted.

DETAILED DESCRIPTION

Figure 1:
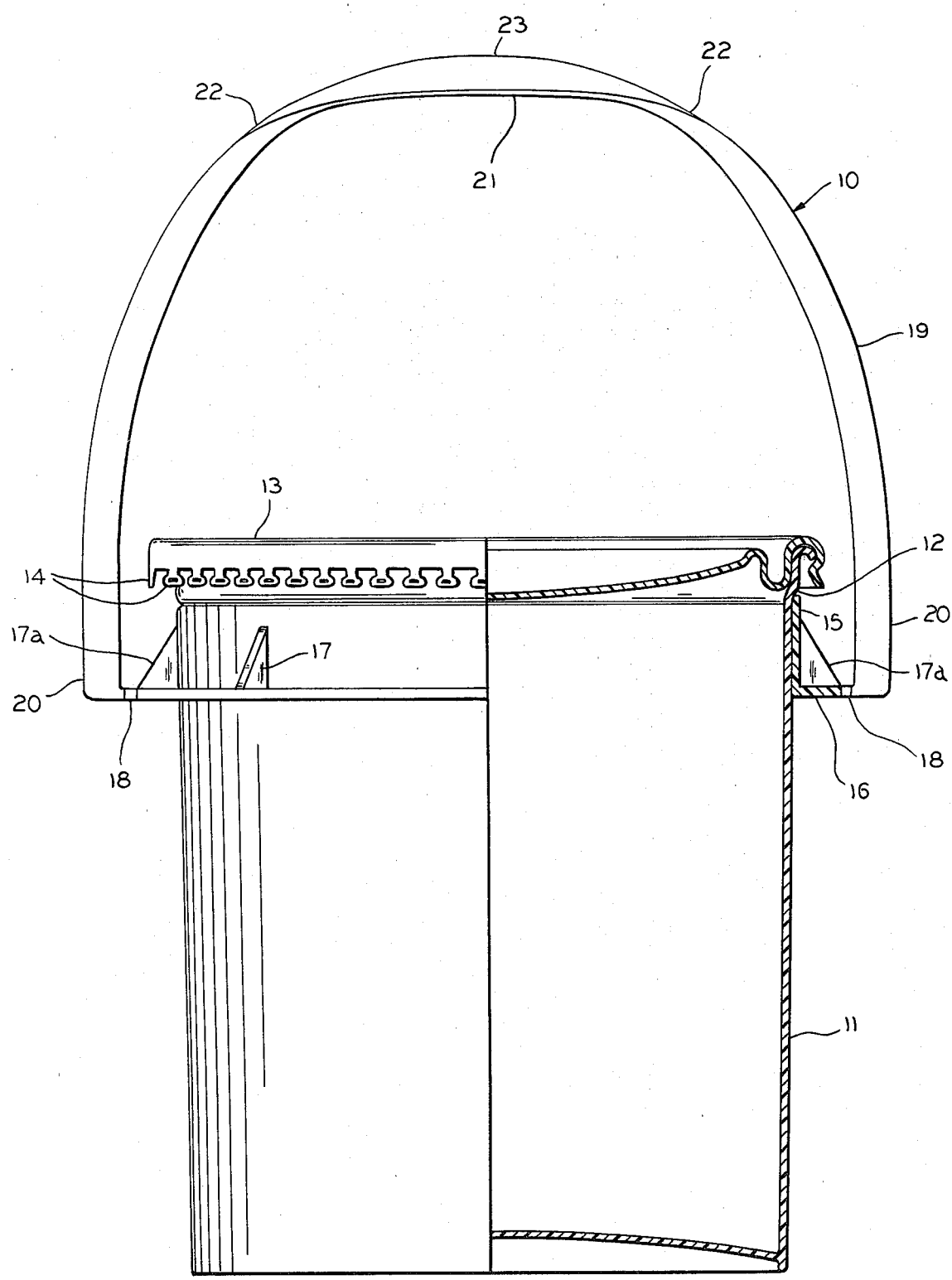
FIG. 1 is an elevational view, partly in section, of a bail in accordance with the present invention applied to a container.

Referring to the drawings, the reference numeral 10 generally indicates a bail in accordance with the present invention. Bail 10 is intended for use with a container 11 having an annular shoulder 12. Container 11 can be formed of various materials, for example metal or plastic, as shown, and may be cylindrical or have a tapered side wall to facilitate nesting of a plurality of empty containers. In addition, container 12 may have a recessed bottom, as shown, to facilitate stacking of containers after they have been filled and sealed. Also container 11 can include a closure or lid 13 having tabs 14 which may be turned down about a lip of the container to secure and seal lid 13 thereto.

Bail 10 has an annular sleeve 15 adapted to be placed about container 11 and abut shoulder 12. Sleeve 15, preferably of plastic, is molded to closely fit the exterior wall of container 11 adjacent shoulder 12, and to be frictionally retained in position abutting shoulder 12 by the close fit of the sleeve to the container. In addition, the carrying of container 11 by means of bail 10 will further cause sleeve 15 to be forced against the wall of container 11 and shoulder 12 as will be hereinafter described.

Bail 10 further includes first reinforcing means for reinforcing sleeve 15. In the embodiment shown in FIGS. 1–3, the first reinforcing means is a flange 16 integral with sleeve 15 and extending substantially from the lower edge of the sleeve. Flange 16 diametrically reinforces sleeve 15 and extends outwardly from its lower edge at substantially a right angle therefrom. Alternatively, flange 16 can extend from another area of sleeve 15 and optionally at an angle either upwardly or downwardly as compared to a right angle.

Bail 10 also includes second reinforcing means operable with sleeve 15 and the first reinforcing means, in this embodiment flange 16, for retaining the disposition between sleeve 15 and the first reinforcing means. In this embodiment, the second reinforcing means comprises web means, specifically a plurality of webs 17 integrally extending between sleeve 15 and flange 16 to retain the disposition therebetween. At least a pair of webs 17a are disposed at or adjacent the tab means as will be hereinafter described. Webs 17a preferably extend outwardly further than webs 17 as best shown in FIGS. 3 and 4. Alternatively, the web means can comprise a web integrally extending between sleeve 15 and flange 16, for example an annular web (not shown), substantially about the circumference of sleeve 15.

Tab means extends from approximately diametrically opposed portions of the first reinforcing means, i.e. in this embodiment flange 16, for providing areas of attachment spaced therefrom at approximately diametrically opposed portions. The tab means are integral with flange 16. In the embodiment shown in the drawings, the tab means comprise a pair of tabs 18 integral with flange 16 and disposed in the same plane as the flange. Preferably, tabs 18 do not extend from precisely diametrically opposed portions of flange 16, but only from approximately diametrically opposed portions. Improved balance of the container, upon carrying by means of the bail of the present invention, is achieved by having tabs 18 extend from flange portions which are less than 180 degrees opposed from each other with the bail portion of the present invention extending about flange 16 substantially for the remaining 360 degrees of its circumference. Webs 17a preferably are integral with each tab 18 as well as with the portion of sleeve 16 to which the tab is integral, to prevent torsional twisting or tearing of tabs 18 upon application and lifting of a container by means of bail 10.

Bail 10 includes a bail portion 19 integral with and pivotable with respect to the tab means and the first reinforcing means. In this embodiment, bail portion 19 is integral with and extends from tabs 18 and is normally disposed substantially concentrically with respect to flange 16. Bail portion 19 is pivotable with respect to tabs 18 due to the flexibility of the plastic material of portions 20 of bail portion 19 extending from the area adjacent tabs 18. Portions 20 preferably have greater flexibility than the remainder of bail portion 19 and provide the areas of bending or pivoting as will be hereinafter described. Portions 20 can obtain their greater flexibility by being free of reinforcement, as particularly noted by the absence of second reinforcing means, e.g. webs 17a as in the area of tabs 18 and third reinforcing means yet to be described. Bail portion 19 further includes a portion 21 having greater resistence to flexing than portions 20. Portion 21 is disposed away from tabs 18 approximately in the center of bail portion 19 and extending along the bail portion for a substantial distance in each direction from its center. In the embodiment shown, portions 20 adjacent to tabs 18 are normally disposed within the same plane as flange 16, while portion 21 at the center of bail portion 19 equidistant from tab 18 is disposed substantially along a curved plane which is perpendicular to the plane defined by portions 20. Between portions 20 and 21 extend second or additional portions 22 which have a progressive change in angular relationship between and approaching the planes defined by portions 20 and portion 21. Thus, in the preferred embodiment, bail portion 19 includes a "twist" by which the center of the bail portion may be readily grasped and lifted with the center portion presenting a substantially horizontal surface to the fingers of the hand, rather than the edge of the vertical structure which, although operable, would cause difficulty and irritation to the hand of the user if lifting of the container is continued for more than a brief period.

Center portion 21 of bail portion 19 preferably further includes third reinforcing means for providing to center portion 21 greater resistance to flexing than could otherwise be attained. As shown in FIGS. 2 and 4, the third reinforcing means in the illustrated embodiment comprises a flange or web 23 extending outwardly and substantially perpendicularly from portion 21, substantially at the vertical center of the portion. The presence of reinforcing web 23, in addition to the "twist" in bail portion 20 between center portion 21 and portions 20, provide a more comfortable handle than could be otherwise attained.

To utilize bail 10 of the present invention, sleeve 15 is placed about container 11, most conveniently, by seating container 11 in the opening provided by sleeve 15. Bail 10 may then be raised along the wall of container 11 until the upper edge of sleeve 15 abuts shoulder 12 of the container. Thereupon sleeve 15, and hence bail 10, is retained in abutting relationship with shoulder 12 by friction, which may be assisted by an upward force applied to flange 16. In storage or other preparation for use, bail 10 will lie substantially concentrically with respect to flange 16 and about the wall of container 11. When lifting of the container is desired, center portion 21 of bail 10 may be grasped and lifted which causes bail portion 19 to be arched into the position substantially shown in FIG. 1. Further lifting of center portion 21 will tighten sleeve 15 about container 11 and against shoulder 12, and permit a lifting of container 11 from its original support surface. Upon restoring container 11 to a support surface and release of portion 21 of bail 10, bail portion 19 will again conveniently return to its substantially concentric position.

Various changes coming within the sphere of the invention may suggest themselves to those skilled in the art; hence the invention is not limited to the specific embodiment shown or described or uses mentioned, but the same is intended to be merely exemplary, the scope of the invention being limited only the appended claims.

I claim:

1. A one-piece bail for a container having an annular shoulder, comprising:
   a sleeve adapted to be pulled onto the container to abut the shoulder thereof, and to be frictionally retained in abutting relationship with the shoulder of the container,
   first reinforcing means integral with said sleeve for diametrically reinforcing said sleeve entirely about the perimeter thereof,
   second reinforcing means operable with said sleeve and said first reinforcing means for retaining the disposition between said sleeve and said first reinforcing means entirely about the perimeter thereof,
   tab means integral with and extending from approximately diametrically opposed portions of said first reinforcing means for providing areas of attachment adjacent to and extending from said first reinforcing means at said approximately diametrically opposed portions, and
   a bail portion integral with said tab means and normally being disposed substantially concentrically with respect to said first reinforcing means, said bail portion being pivotable with respect to said tab means and said first reinforcing means into a container carrying position,
   said first reinforcing means extending substantially outwardly from said sleeve so as to extend said areas of attachment of said tab means beyond the shoulder of the container, said second reinforcing means extending from a point on said sleeve spaced from said first reinforcing means to a point on said first reinforcing means spaced from said sleeve.

2. The bail as defined in claim 1, wherein said first reinforcing means is an annular flange which extends outwardly from said sleeve at substantially a right angle therefrom.

3. The bail as defined in claim 2, wherein said flange extends substantially from an edge of said sleeve.

4. The bail as defined in claim 3, wherein said flange extends substantially from the lower edge of said sleeve.

5. The bail as defined in claim 1, wherein said second reinforcing means comprises web means for retaining the disposition between said sleeve and said first reinforcing means.

6. The bail as defined in claim 5, wherein said web means comprises a web extending substantially about the circumference of said sleeve.

7. The bail as defined in claim 1, wherein said web means comprises a plurality of webs, at least a pair of said webs being disposed adjacent said tab means.

8. The bail as defined in claim 1, wherein said first reinforcing means is an annular flange extending outwardly from said sleeve, and said tab means comprise a pair of tabs integral with said flange, extending from the edge thereof, and disposed in the same plane as said flange.

9. The bail as defined in claim 1, wherein said bail portion includes a portion of greater flexibility than the remainder of said bail portion, said portion of greater flexibility being approximately adjacent said tab means.

10. The bail as defined in claim 9, wherein said bail portion includes a portion having greater resistance to flexing than said portion of greater flexibility, said portion of greater resistance to flexing being disposed away from said tab means approximately in the center of said bail portion and extending along said bail portion for a substantial distance in each direction from the center thereof.

11. The bail as defined in claim 1, wherein said first reinforcing means is an annular flange extending outwardly from said sleeve and said bail portion is continuous and includes first portions adjacent said tab means which are normally disposed within the same plane as said flange, a center portion spaced from said first portions and located equidistant from said tab means which is disposed substantially along a curved plane which is perpendicular to the plane defined by said first portions, and second portions extending between and joining said first portions and said center portion, each of said second portions having a progressive change in angular relationship between and approaching said first portions and said center portion.

12. The bail as defined in claim 11, wherein said center portion of said bail portion includes third reinforcing means for providing to said center portion greater resistance to flexing.

* * * * *